(12) United States Patent
Fukasaku et al.

(10) Patent No.: US 12,715,596 B2
(45) Date of Patent: Aug. 25, 2026

(54) AIRCRAFT COMPRISING AT LEAST ONE ENGINE MOUNTING SYSTEM HAVING WING MOUNTS POSITIONED APPROXIMATELY IN A MEDIAN LONGITUDINAL PLANE

(71) Applicant: Airbus Operations SAS, Toulouse (FR)

(72) Inventors: Kotaro Fukasaku, Toulouse (FR); Lionel Czapla, Toulouse (FR); Rémi Amargier, Toulouse (FR); Alain Razafindrabe, Toulouse (FR); Thomas Spigolon, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1 day.

(21) Appl. No.: 18/820,521

(22) Filed: Aug. 30, 2024

(65) Prior Publication Data

US 2025/0074612 A1 Mar. 6, 2025

(30) Foreign Application Priority Data

Sep. 4, 2023 (FR) ....................................... 2309252

(51) Int. Cl.
*B64D 27/40* (2024.01)

(52) U.S. Cl.
CPC .................................. *B64D 27/402* (2024.01)

(58) Field of Classification Search
CPC .... B64D 27/402; B64D 27/40; B64D 27/404; B64D 27/12
See application file for complete search history.

(56) References Cited

U.S. PATENT DOCUMENTS

| | | | |
|---|---|---|---|
| 3,831,888 | A | 8/1974 | Baker et al. |
| 4,560,122 | A | 12/1985 | Parkinson et al. |
| 6,095,456 | A | 8/2000 | Powell |
| 2021/0101689 | A1 | 4/2021 | Blanc et al. |

FOREIGN PATENT DOCUMENTS

| | | | |
|---|---|---|---|
| EP | 0115914 | A1 | 8/1984 |
| FR | 3096346 | A1 | 11/2020 |
| FR | 3099464 | A1 | 2/2021 |

OTHER PUBLICATIONS

French Search Report for corresponding French Patent Application No. 2309252 dated Feb. 26, 2024.

*Primary Examiner* — Timothy D Collins
*Assistant Examiner* — Terri L Filosi
(74) *Attorney, Agent, or Firm* — Greer, Burns & Crain, Ltd.

(57) ABSTRACT

An aircraft comprising at least one engine mounting system which connects a propulsion unit and a wing and which comprises a primary structure, engine mounts connecting the primary structure and the propulsion unit, as well as at least first, second and third wing mounts connecting the primary structure and the wing structure, the first and second wing mounts being offset height-wise with respect to one another, the third wing mount being offset in the longitudinal direction toward the rear with respect to the first and second wing mounts.

20 Claims, 5 Drawing Sheets

Fig. 6
54 F46.1 46.1 46 46.2 Z X Py A54 72 70 54.2 54.1 54.3 56.1 58.1 A58 56.3 56 58.3 58 60 50 56.2 58.2 66 68 62
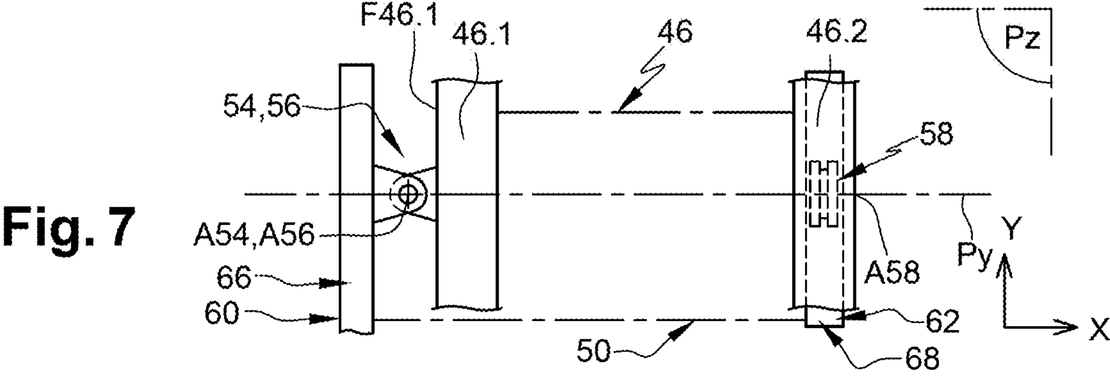
Fig. 7
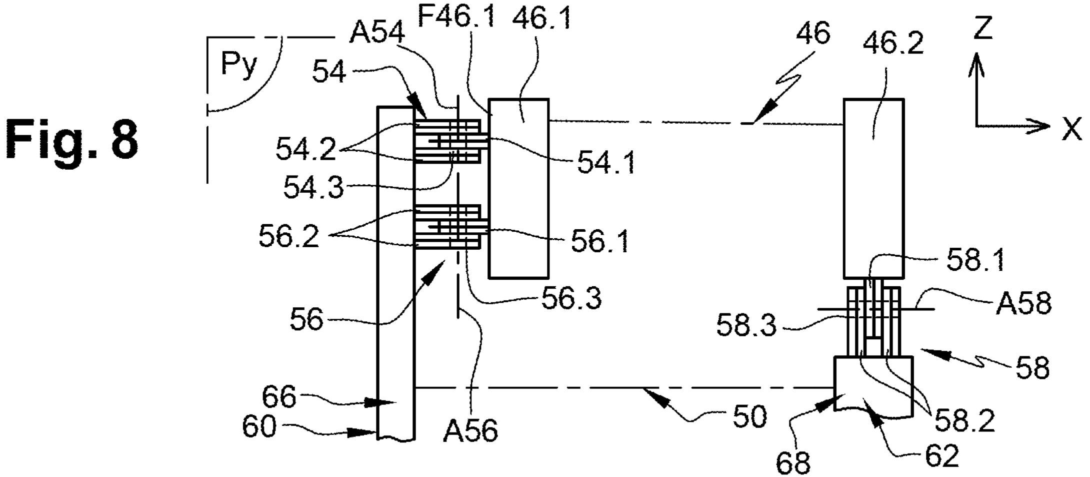
Fig. 8

AIRCRAFT COMPRISING AT LEAST ONE ENGINE MOUNTING SYSTEM HAVING WING MOUNTS POSITIONED APPROXIMATELY IN A MEDIAN LONGITUDINAL PLANE

CROSS-REFERENCES TO RELATED APPLICATIONS

This application claims the benefit of French Patent Application Number 2309252 filed on Sep. 4, 2023, the entire disclosure of which is incorporated herein by way of reference.

FIELD OF THE INVENTION

The present application relates to an aircraft comprising at least one engine mounting system connecting a propulsion unit to the wing of the aircraft and having wing mounts positioned approximately in a median longitudinal plane.

BACKGROUND OF THE INVENTION

According to an embodiment that can be seen in FIG. 1, an aircraft 10 comprises a fuselage 12, at least one wing 14 connected to the fuselage 12, and propulsion units 16 positioned one on each side of the fuselage 12 and connected to the wing 14 by an engine mounting system.

According to an embodiment that can be seen in FIG. 2, each propulsion unit 16 comprises an engine 20, a propeller 22 having an axis of rotation A22, a gearbox 24 connecting the engine 20 and the propeller 22, the mounting system 18 connecting the motor 20 and the gearbox 24 to the wing 14. Whatever the embodiment, the propulsion unit 16 has a thrust line. In the case of a propeller engine, the thrust line coincides with the axis of rotation A22 of the propeller.

For the remainder of the description, a longitudinal direction X is parallel to the thrust line. A median longitudinal plane Py is a vertical plane containing the thrust line. A transverse plane Px is perpendicular to the longitudinal direction X. A horizontal transverse direction Y is perpendicular to the longitudinal direction X and oriented horizontally. A vertical direction Z is perpendicular to the longitudinal direction X and oriented vertically. The concepts “front” and “rear” refer to the direction of flow of the air with respect to the aircraft in flight, the air flowing from the front to the rear.

According to an embodiment that can be seen in FIG. 3, the engine mounting system 18 comprises a front arch 26 connected by a plurality of interfaces to a front region of the engine 20, and a rear arch 28 connected by a plurality of interfaces to a rear region of the engine 20. Each front or rear arch 26, 28 comprises a transverse and horizontal part 26.1, 28.1 as well as substantially vertical first and second uprights 26.2, 26.3, 28.2, 28.3 which are offset along the horizontal transverse direction Y.

The front and rear arches 26, 28 are connected to one another by oblique links 30 so as to form a latticework structure.

The engine mounting system 18 comprises wing mounts connecting the rear arch 28 to the wing 14 at anchor points 32.1 to 32.5. Thus, the transverse part 28.1 of the rear arch 28 is connected to the wing 14 at an anchor point 32.1 that is situated at the median longitudinal plane Py. The first upright 28.2 of the rear arch 28 is connected to the wing 14 at two anchor points 32.2, 32.3 that are situated in a first vertical longitudinal plane that is distanced from the median longitudinal plane Py. The second upright 28.3 of the rear arch 28 is connected to the wing 14 at two anchor points 32.4, 32.5 that are situated in a second vertical longitudinal plane, the first and second vertical longitudinal planes being symmetrical about the median longitudinal plane Py. Because the first and second uprights 28.2, 28.3 are positioned one on each side of the engine 20, the first and second vertical longitudinal planes are widely spaced in the transverse and horizontal direction Y which means that the fairing that covers the engine mounting system 18 is relatively wide at the wing 14, which is penalizing in terms of aerodynamic performance.

SUMMARY OF THE INVENTION

The present invention seeks to overcome some or all of the drawbacks in the prior art.

To this end, the subject of the invention is an aircraft comprising at least one wing, at least one propulsion unit and at least one engine mounting system connecting the propulsion unit and the wing, the latter having a wing structure; said engine mounting system comprising a primary structure, engine mounts connecting the primary structure and the propulsion unit, as well as at least first, second and third wing mounts connecting the primary structure and the wing structure, the primary structure having a median longitudinal plane and extending from the front toward the rear in a longitudinal direction.

According to the invention, the first and second wing mounts are offset height-wise with respect to one another, the third wing mount being offset in the longitudinal direction toward the rear with respect to the first and second wing mounts.

This arrangement means that the first, second and third wing mounts can be positioned in a vertical longitudinal plane, making it possible to optimize the transmission of load between the primary structure and the wing structure, the load being introduced into the wing structure with little or no offset with respect to a vertical longitudinal plane.

According to another feature, the first, second and third wing mounts are configured to form a set of statically determinate connections between the wing structure and the primary structure.

According to another feature, the wing structure comprises a front spar and a second spar offset in the longitudinal direction toward the rear with respect to the first spar, the first and second wing mounts being connected to the front spar, the third wing mount being connected to the second spar.

According to another feature, the first, second and third wing mounts each have a connection comprising at least one axis of pivoting and/or a swivel point positioned in the median longitudinal plane or in a vertical longitudinal plane that is closely spaced from the median longitudinal plane.

According to another feature, the third wing mount comprises a third axis of pivoting parallel to the longitudinal direction and contained in the median longitudinal plane.

According to another feature, the first wing mount comprises a first axis of pivoting parallel to a vertical direction. To complement this, the second wing mount comprises a second axis of pivoting parallel to the longitudinal direction.

According to another feature, the first wing mount comprises a first axis of pivoting parallel to a vertical direction. To complement this, the second wing mount comprises a second axis of pivoting aligned with the first axis of pivoting.

According to another feature, the first wing mount comprises a first axis of pivoting parallel to the longitudinal direction. To complement this, the second wing mount comprises a second axis of pivoting parallel to a vertical direction.

According to another feature, each of the first, second and third wing mounts comprises a lug or a plate secured to a first of the elements that are the wing structure and the primary structure, a clevis secured to a second, different than the first, of the elements that are the wing structure and the primary structure, and a cylindrical pin secured to the lug or the plate and to the clevis and embodying the first, second or third axis of pivoting.

According to another feature, the first wing mount comprises at least one axis of pivoting parallel to the vertical direction. To complement this, the second wing mount comprises a ball joint connection.

According to another feature, the first wing mount comprises at least a first lug secured to the wing structure, at least a second lug secured to the primary structure, at least one link extending between the first and second ends, a first cylindrical pin secured to the first lug and to the first end of the link and embodying a first axis of pivoting parallel to the vertical direction, and a second cylindrical pin secured to the second lug and to the second end of the link and embodying a second axis of pivoting parallel to the vertical direction.

According to another feature, the first wing mount comprises a lug secured to a first of the elements that are the wing structure and the primary structure, a clevis secured to a second, different than the first, of the elements that are the wing structure and the primary structure, and a cylindrical pin secured to the lug and to the clevis and embodying an axis of pivoting parallel to the vertical direction, the lug comprising an oblong hole to house the cylindrical pin, its long dimension being oriented in the longitudinal direction so as to allow the lug to move in the longitudinal direction with respect to the clevis.

According to another feature, the second wing mount comprises a second axis of pivoting parallel to a horizontal transverse direction perpendicular to the longitudinal direction.

According to another feature, the second wing mount comprises a lug secured to a first of the elements that are the wing structure and the primary structure, a clevis secured to a second, different than the first, of the elements that are the wing structure and the primary structure, and a cylindrical pin secured to the lug and to the clevis and embodying the second axis of pivoting, the ball joint connection being interposed between the lug and the cylindrical pin.

According to another feature, each lug or plate comprises two walls pressed one against the other.

According to another feature, each clevis comprises two parallel flanges each comprising two walls pressed one against the other.

BRIEF DESCRIPTION OF THE DRAWINGS

Other features and advantages will become apparent from the following description of the invention, the description being given solely by way of example and with reference to the appended drawings, in which:

FIG. 6 is a schematic side view of the wing mounts visible in FIG. 5, FIG. 7 is a schematic plan view of the wing mounts of an engine mounting system, illustrating a second embodiment of the invention, FIG. 8 is a schematic side view of the wing mounts visible in FIG. 7.

DETAILED DESCRIPTION OF THE PREFERRED EMBODIMENTS

Figures 1, 2, 3:
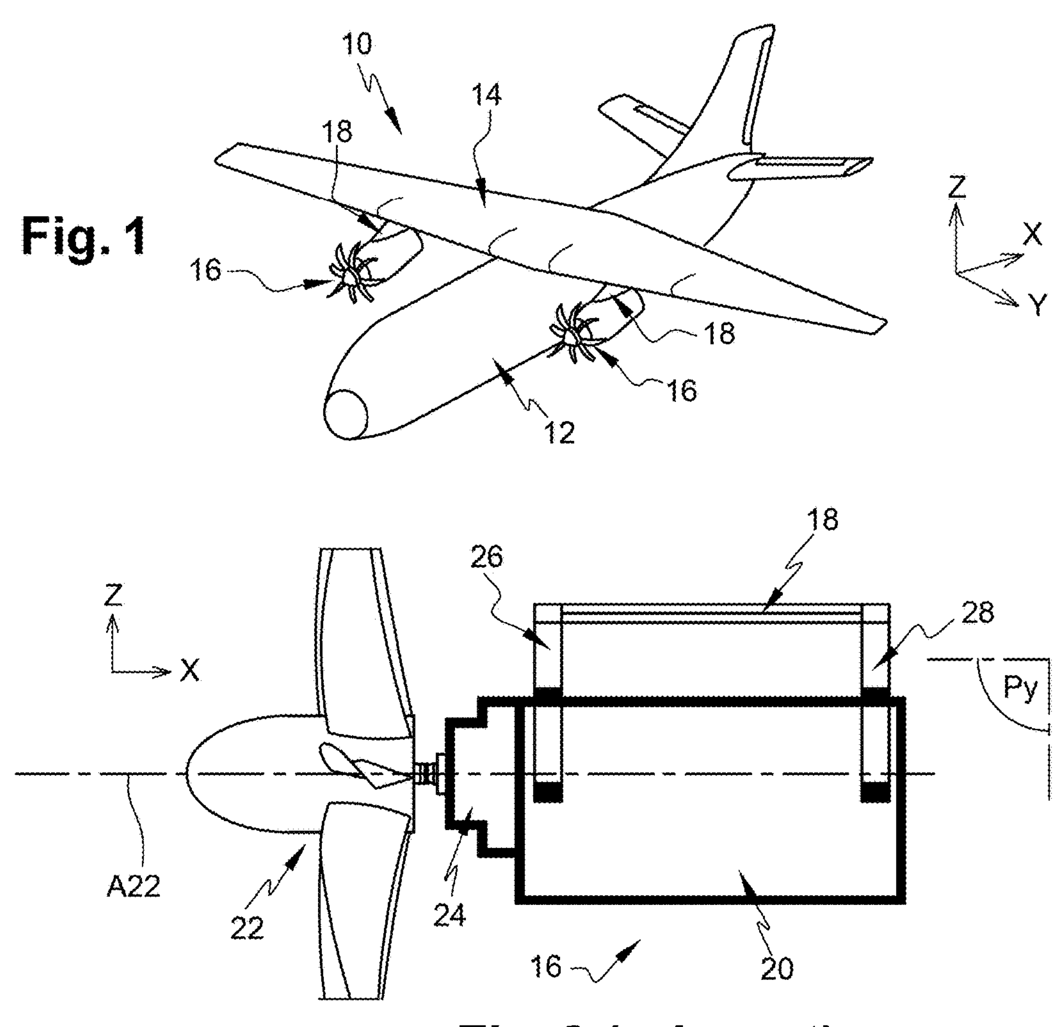
FIG. 1 is a perspective view of an aircraft.
FIG. 2 is a schematic side view of a propulsion unit and of an engine mounting system, without fairings, illustrating one embodiment of the prior art.
FIG. 3 is a perspective view of an engine mounting system, illustrating one embodiment of the prior art.
Figure 4:
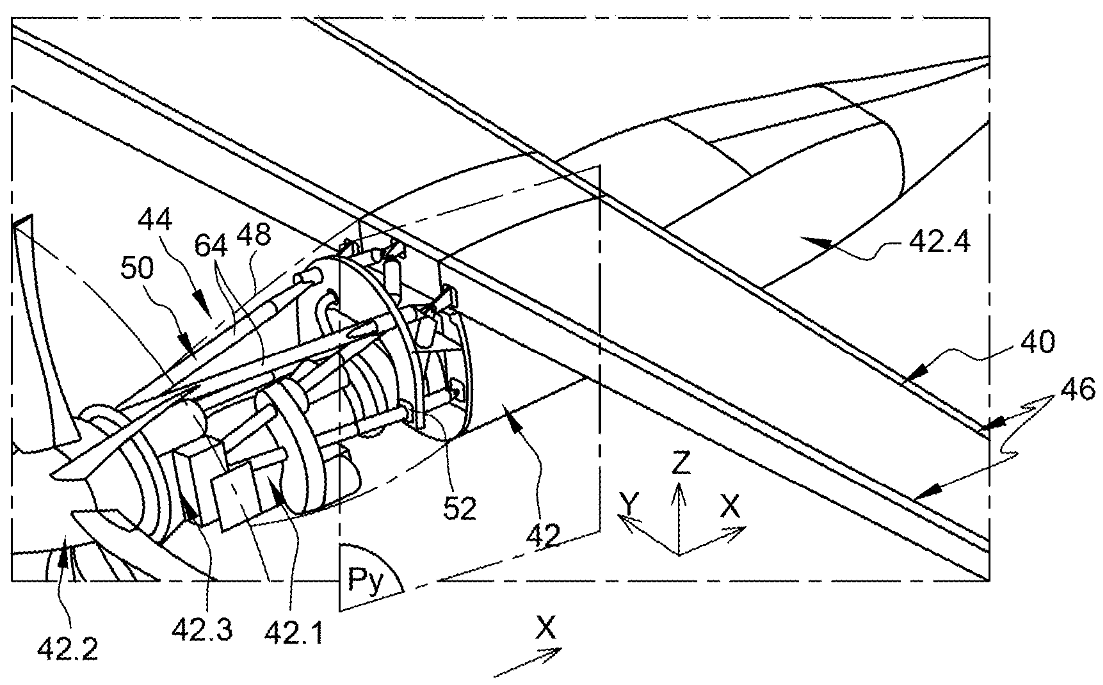
FIG. 4 is a perspective view of a wing, of a propulsion unit and of an engine mounting system, illustrating one embodiment of the invention.

According to one embodiment, an aircraft comprises at least one wing 40 and at least one propulsion unit 42 connected to the wing 40 by at least one engine mounting system 44.

According to one embodiment, the wing 40 comprises a wing structure 46 and an aerodynamic wall 48 supported by the wing structure 46, the latter comprising at least first and second spars 46.1, 46.2 spaced apart in the longitudinal direction X, and ribs connecting the first and second spars 46.1, 46.2.

According to one embodiment, the propulsion unit 42 comprises at least an engine 42.1, a propeller 42.2 and a gearbox 42.3 connecting the engine 42.1 and the propeller 42.2. The propeller 42.2 defines a thrust line substantially coinciding with its axis of rotation.

In one configuration, the engine 42.1 is a turbomachine supplied with fuel (hydrogen, aviation fuel or the like). In another configuration, the propulsion unit 42 comprises a plurality of electric motors and a set of fuel cells to supply the electric motors with electrical energy. Of course, the invention is not limited to these configurations. Thus, the propulsion unit 42 could comprise a bypass turbine engine.

The propulsion unit 42 also comprises a fairing 42.4 to encase the engine(s) and the equipment therefor. This fairing 42.4 may adopt different forms according to the type of engine.

The engine mounting system 44 comprises a primary structure 50, engine mounts 52 connecting the primary structure 50 and the propulsion unit 42, wing mounts 54, 56, 58 connecting the primary structure 50 and the wing 40, and at least one fairing notably encasing the primary structure 50.

According to one configuration, the primary structure 50 comprises a front arch 60 connected by a plurality of engine mounts 52 to a front region of the propulsion unit 42, and a rear arch 62 connected by a plurality of engine mounts 52 to a rear region of the propulsion unit 42. To complement this, the primary structure 50 comprises a plurality of reinforcements 64 connecting the front and rear arches 60, 62 to form a latticework structure.

Of course, the invention is not restricted to this embodiment for the primary structure 50. According to another configuration, the primary structure 50 could exhibit a box structure.

The primary structure 50 and the engine mounts 52 are not described further since they are known to the person skilled in the art and are dependent on the propulsion unit 42.

Whatever the embodiment, the primary structure 50 comprises at least first and second interfaces 66, 68, each of these being connected to the wing 40 by wing mounts 54, 56, 58.

According to embodiments visible in FIGS. 7 to 13, the primary structure 50 comprises only first and second interfaces 66, 68, such as the front and rear arches 60, 62 for example, connected by three wing mounts 54, 56, 58.

Figure 5:
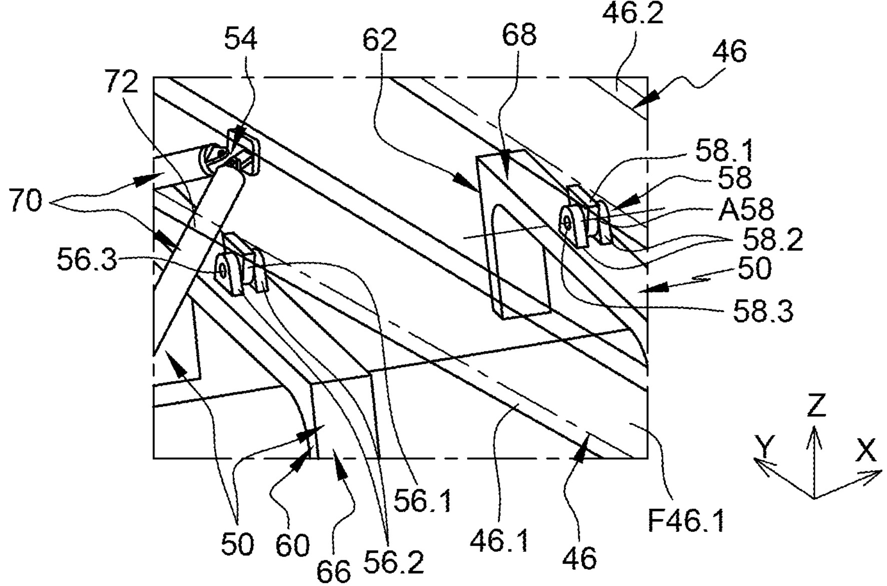
FIG. 5 is a perspective view of the wing mounts of an engine mounting system, illustrating a first embodiment of the invention.

According to another embodiment visible in FIGS. 5 and 6, the primary structure 50 comprises first, second and third interfaces 66, 68, 70, such as at least one link 72 and the front and rear arches 60, 62 which are respectively connected by first, second and third wing mounts 54, 56, 58.

Of course, the primary structure 50 could comprise more than three interfaces 66, 68, 70 and more than three wing mounts 54, 56, 58.

At minimum, the primary structure 50 comprises at least first and second interfaces 66, 68 and the engine mounting system 44 comprises at least three wing mounts 54, 56, 58 connecting said at least two interfaces 66, 68 and the wing structure 46. The primary structure 50 has a median longitudinal plane Py which corresponds to a vertical (when the aircraft is on the ground) plane containing the thrust line of the propulsion unit 42 and which extends from the front toward the rear in a longitudinal direction X.

Each wing mount 54, 56, 58 comprises at least one axis of pivoting A54, A56, A58 or a swivel point.

According to one particular feature, the axis of pivoting A54, A56, A58 or the swivel point of each wing mount 54, 56, 58 is positioned in the median longitudinal plane Py of the engine mounting system 44 or is closely spaced from this plane. What is meant by closely spaced is that the axis of pivoting A54, A56, A58 or the swivel point is positioned in a vertical longitudinal plane parallel to the median longitudinal plane Py and spaced away from the latter plane by a distance of less than 10 cm.

In one arrangement, the first and second wing mounts 54, 56 are connected to a first spar 46.1 of the wing structure 46 and the third wing mount 58 is connected to a second spar 46.2 of the wing structure 46 that is offset in the longitudinal direction toward the rear with respect to the first spar 46.1. With this arrangement, the first and second wing mounts 54, 56 are offset height-wise (in the vertical direction Z) with respect to one another, the third wing mount 58 being offset in the longitudinal direction toward the rear with respect to the first and second wing mounts 54, 56. With this arrangement, the first, second and third wing mounts 54, 56, 58 may be positioned in a vertical longitudinal plane.

In one configuration, the first spar 46.1 corresponds to the front spar of the wing structure 46, the one positioned furthest toward the front. The second spar 46.2 corresponds to the rear spar of the wing structure 46, the one positioned furthest toward the rear. However, the second spar 46.2 could correspond to an intermediate spar situated between the front and rear spars.

According to the various embodiments, the third axis of pivoting A58 of the third wing mount 58 is parallel to the longitudinal direction X and contained in the median longitudinal plane Py. This third wing mount 58 is situated beneath the second spar 46.2 of the wing structure 46. According to one embodiment, the third wing mount 58 comprises a lug 58.1 that is substantially parallel to a transverse plane Px and secured to a first of the elements that are the wing structure 46 and the primary structure 50, a clevis 58.2 having two flanges which are positioned in transverse planes Px, and which is secured to a second (different than the first) of the elements that are the wing structure 46 and the primary structure 50, and a cylindrical pin 58.3 secured to the lug 58.1 and to the clevis 58.2 and embodying the third axis of pivoting A58.

According to a first embodiment visible in FIGS. 5 and 6, the first axis of pivoting A54 of the first wing mount 54 is parallel to the vertical direction Z. This first wing mount 54 is connected to a front face F46.1 of the first spar 46.1. According to one embodiment, the first wing mount 54 comprises a lug 54.1, positioned in a horizontal plane Pz and secured to a first of the elements that are the wing structure 46 and the primary structure 50, a clevis 54.2 having flanges which are positioned in horizontal planes Pz, and which is secured to a second (different than the first) of the elements that are the wing structure 46 and the primary structure 50, and a cylindrical pin 54.3 secured to the lug 54.1 and to the clevis 54.2 and embodying the first axis of pivoting A54.

According to this first embodiment, the second axis of pivoting A56 of the second wing mount 56 is parallel to the longitudinal direction X. This second wing mount 56 is situated beneath the first spar 46.1 of the wing structure 46. According to one embodiment, the second wing mount 56 comprises a lug 56.1, positioned in a transverse plane Px and secured to a first of the elements that are the wing structure 46 and the primary structure 50, a clevis 56.2 having flanges which are positioned in transverse planes Px, and which is secured to a second (different than the first) of the elements that are the wing structure 46 and the primary structure 50, and a cylindrical pin 56.3 secured to the lug 56.1 and to the clevis 56.2 and embodying the second axis of pivoting A56.

According to this first embodiment, the first wing mount 54 reacts load in the longitudinal direction X and moments about the longitudinal direction X, the second wing mount 56 reacts load in the horizontal and vertical transverse directions Y, Z, and the third wing mount 58 reacts moments about the horizontal and vertical transverse directions Y, Z.

According to a second embodiment visible in FIGS. 7 and 8, the first axis of pivoting A54 of the first wing mount 54 is parallel to the vertical direction Z. This first wing mount 54 is connected to a front face F46.1 of the first spar 46.1. According to one embodiment, the first wing mount 54 comprises a lug 54.1 positioned in a horizontal plane Pz and secured to a first of the elements that are the wing structure 46 and the primary structure 50, a clevis 54.2 having flanges which are positioned in horizontal planes Pz, and which is secured to a second (different than the first) of the elements that are the wing structure 46 and the primary structure 50, and a cylindrical pin 54.3 secured to the lug 54.1 and to the clevis 54.2 and embodying the first axis of pivoting A54.

To complement this, the second axis of pivoting A56 of the second wing mount 56 is parallel to the vertical direction Z and aligned with the first axis of pivoting A54. This second wing mount 56 is connected to a front face F46.1 of the first spar 46.1. According to one embodiment, the second wing mount 56 comprises a lug 56.1 positioned in a horizontal plane Pz and secured to a first of the elements that are the wing structure 46 and the primary structure 50, a clevis 56.2 having flanges which are positioned in horizontal planes Pz, and which is secured to a second (different than the first) of the elements that are the wing structure 46 and the primary structure 50, and a cylindrical pin 56.3 secured to the lug 56.1 and to the clevis 56.2 and embodying the second axis of pivoting A56.

According to this second embodiment, the first wing mount 54 reacts load in the longitudinal direction X and moments about the longitudinal direction X, the second wing mount 56 reacts load in the horizontal transverse direction Y and moments about the horizontal transverse direction Y, and the third wing mount 58 reacts load in the vertical direction Z and moments about the vertical direction Z.

Figure 9:
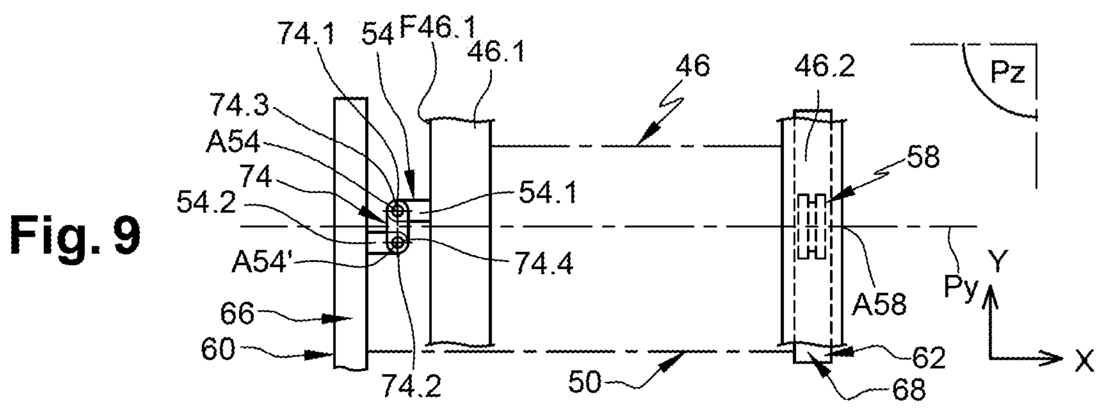
FIG. 9 is a schematic plan view of the wing mounts of an engine mounting system, illustrating a third embodiment of the invention.
Figure 10:
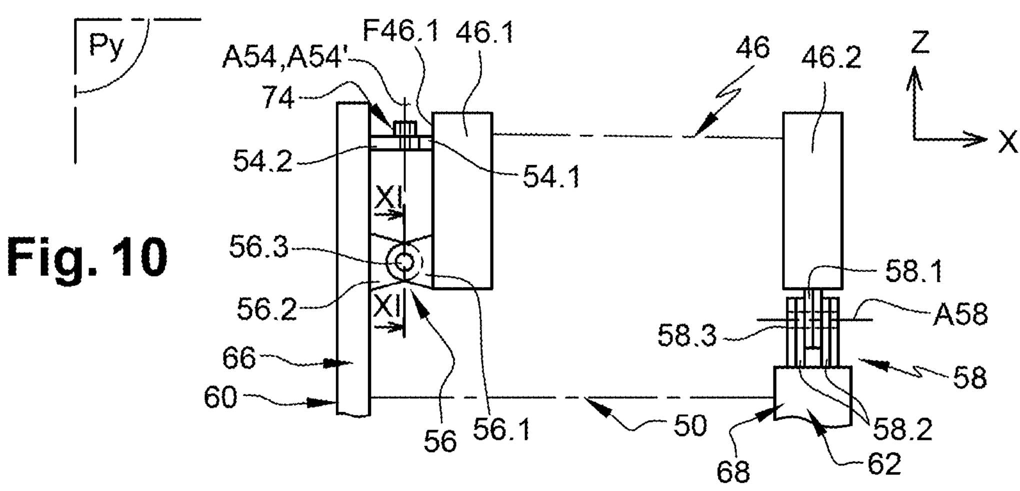
FIG. 10 is a schematic side view of the wing mounts visible in FIG. 9.
Figure 11:
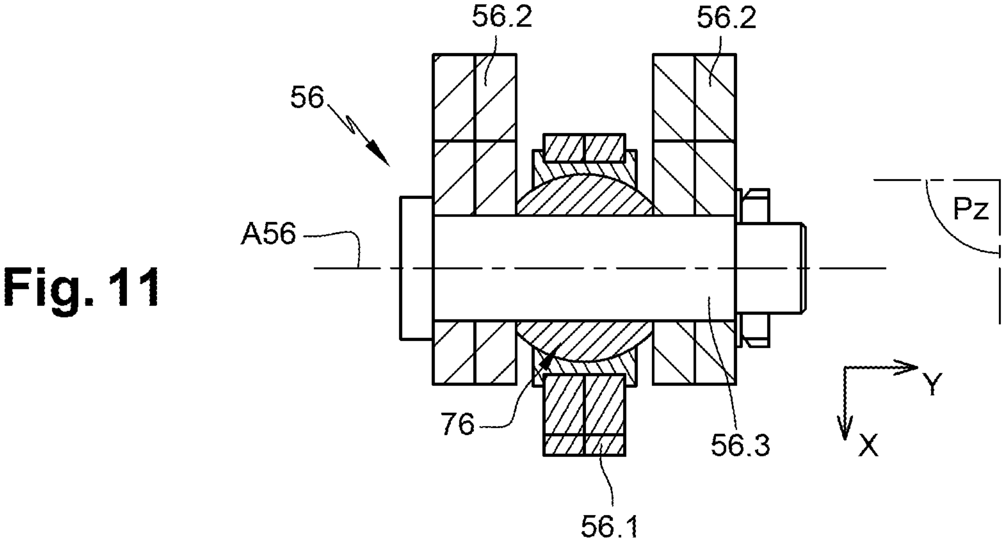
FIG. 11 is a cross section, on III-III of FIG. 10, of a wing mount, illustrating one embodiment of the invention.

According to a third embodiment visible in FIGS. 9 to 11, the first wing mount 54 comprises two axes of pivoting A54, A54' that are mutually parallel and parallel to the vertical direction Z, and closely spaced away from the median longitudinal plane Py. According to one embodiment, the first wing mount 54 comprises at least a first lug 54.1 positioned in a horizontal plane Pz and secured to the wing structure 46, at least a second lug 54.2 positioned in a horizontal plane Pz and secured to the primary structure 50, at least one link 74 (also referred to as a clevis tang) extending between first and second ends 74.1, 74.2, a first cylindrical pin 74.3 secured to the first lug 54.1 and to the first end 74.1 of the link 74 and embodying the first axis of pivoting A54, and a second cylindrical pin 74.4 secured to the second lug 54.2 and to the second end 74.2 of the link 74 and embodying the second axis of pivoting A54'. In one arrangement, the first wing mount 54 comprises two links 74 positioned one on each side of the first and second lugs 54.1, 54.2. In another arrangement, the first wing mount 54 comprises two mutually parallel and closely spaced first lugs 54.1 forming a first clevis, two mutually parallel and closely spaced second lugs 54.2 forming a second clevis, and a link 74 positioned between the lugs 54.1, 54.2 of the first and second clevises.

As a variant, the first wing mount 54 comprises a lug 54.1 positioned in a horizontal plane Pz and secured to a first of the elements that are the wing structure 46 and the primary structure 50, two closely spaced lugs 54.2 positioned in horizontal planes Pz and forming a clevis 54.2 and secured to a second (different than the first) of the elements that are the wing structure 46 and the primary structure 50, and a cylindrical pin 54.3 secured to the lug 54.1 and to the clevis 54.2 and embodying an axis of pivoting A54 parallel to the vertical direction Z. In this variant, the lug 54.1 comprises an oblong hole to house the cylindrical pin 54.3, its long dimension being oriented in the longitudinal direction X, greater than the diameter of the cylindrical pin 54.3, so as to allow the lug 54.1 to move in the longitudinal direction X with respect to the clevis 54.2.

In these two variants, the first wing mount 54 comprises at least one axis of pivoting A54, A54' which is positioned in the median longitudinal plane Py or in a vertical longitudinal plane closely spaced from the latter plane.

According to the third embodiment, the second axis of pivoting A56 of the second wing mount 56 is parallel to the horizontal transverse direction Y. This second wing mount 56 is connected to a front face F46.1 of the first spar 46.1. According to one embodiment, the second wing mount 56 comprises a lug 56.1 positioned in a vertical longitudinal plane parallel to the median longitudinal plane Py and secured to a first of the elements that are the wing structure 46 and the primary structure 50, a clevis 56.2 having flanges which are positioned in vertical longitudinal planes parallel to the median longitudinal plane Py, and which is secured to a second (different than the first) of the elements that are the wing structure 46 and the primary structure 50, and a cylindrical pin 56.3 secured to the lug 56.1 and to the clevis 56.2 and embodying the second axis of pivoting A56. According to this third embodiment, as illustrated in FIG. 11, the second wing mount 56 comprises a ball joint connection 76 interposed between the lug 56.1 and the cylindrical pin 56.3.

According to this third embodiment, the first wing mount 54 reacts moments about the lateral direction Y, the second wing mount 56 reacts load in the three directions X, Y, Z, and the third wing mount 58 reacts moments about the horizontal and vertical transverse directions Y, Z.

Figure 12:
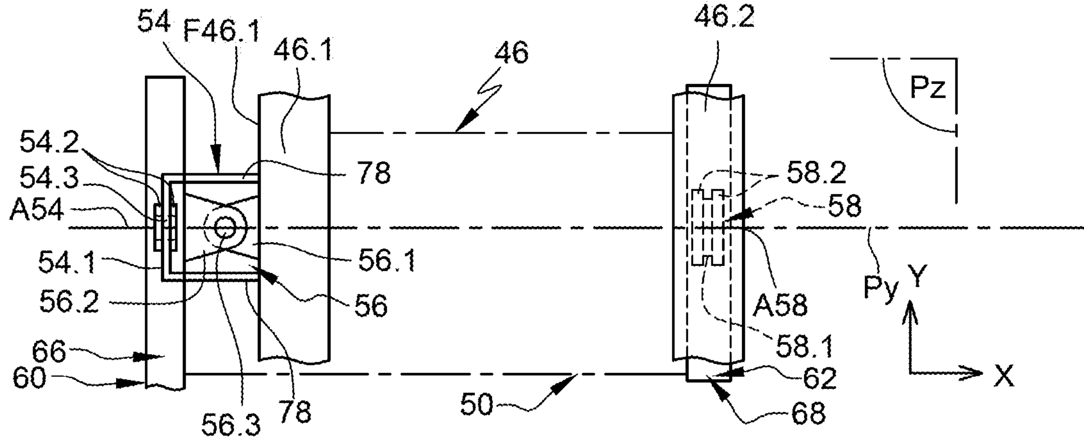
FIG. 12 is a schematic plan view of the wing mounts of an engine mounting system, illustrating a fourth embodiment of the invention.
Figure 13:
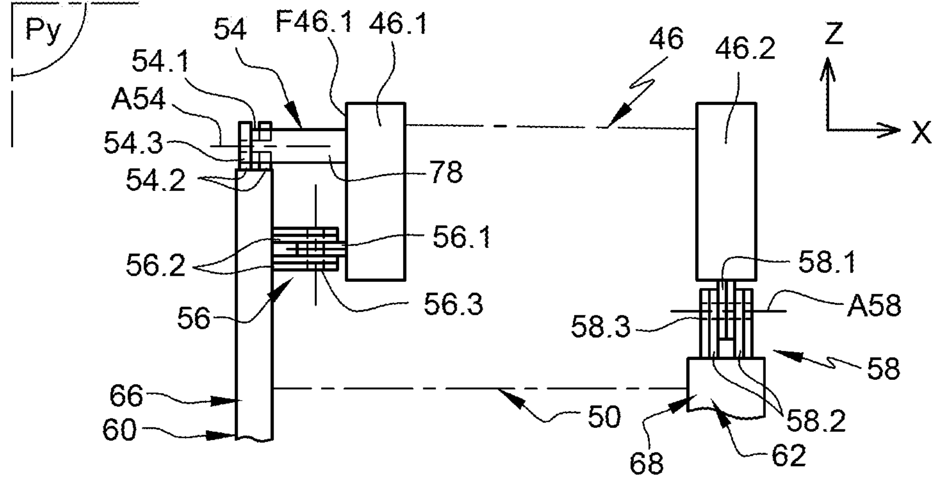
FIG. 13 is a schematic side view of the wing mounts visible in FIG. 12.

According to a fourth embodiment visible in FIGS. 12 and 13, the first axis of pivoting A54 of the first wing mount 54 is parallel to the longitudinal direction X. This first wing mount 54 is connected to a front face F46.1 of the first spar 46.1 and to a horizontal face of the primary structure 50. According to one embodiment, the first wing mount 54 comprises a plate 54.1, positioned in a transverse plane Px and secured to a first of the elements that are the wing structure 46 and the primary structure 50, a clevis 54.2 having flanges which are positioned in transverse planes Px, and which is secured to a second (different than the first) of the elements that are the wing structure 46 and the primary structure 50, and a cylindrical pin 54.3 secured to the plate 54.1 and to the clevis 54.2 and embodying the first axis of pivoting A54. According to one arrangement, the clevis 54.2 is secured to the primary structure 50. To complement this, the plate 54.1 is connected to the front face F46.1 of the first spar 46.1 by two lugs 78 which are positioned one on each side of the clevis 54.2

To complement this, the second axis of pivoting A56 of the second wing mount 56 is parallel to the vertical direction Z. This second wing mount 56 is connected to a front face F46.1 of the first spar 46.1. According to one embodiment, the second wing mount 56 comprises a lug 56.1 positioned in a horizontal plane Pz and secured to a first of the elements that are the wing structure 46 and the primary structure 50, a clevis 56.2 having flanges which are positioned in horizontal planes Pz, and which is secured to a second (different than the first) of the elements that are the wing structure 46 and the primary structure 50, and a cylindrical pin 56.3 secured to the lug 56.1 and to the clevis 56.2 and embodying the second axis of pivoting A56.

According to this fourth embodiment, the first wing mount 54 reacts load in the vertical direction Z and moments about the longitudinal direction X, the second wing mount 56 reacts load in the longitudinal direction X and the horizontal transverse direction Y, and the third wing mount 58 reacts moments about the horizontal and vertical transverse directions Y, Z.

Of course, the invention is not restricted to these four embodiments. Other ways of embodying the first, second and third wing mounts may be envisioned.

Whatever the embodiment, the first, second and third wing mounts 54, 56, 58 are arranged in a vertical longitudinal plane, making it possible to optimize the transmission of load between the primary structure 50 and the wing structure 46, the load being introduced into the wing structure 46 with little or no offset with respect to a vertical longitudinal plane.

The first, second and third wing mounts 54, 56, 58 are configured to react load and moments in the median longitudinal plane Py or in a vertical longitudinal plane closely spaced from the latter plane. In one configuration, the first, second and third wing mounts 54, 56, 58 each have a connection comprising at least one axis of pivoting and/or a swivel point positioned in the median longitudinal plane Py of the engine mounting system 44 or in a vertical longitudinal plane that is closely spaced from the latter plane. This solution allows load to be introduced into the wing structure 46 with little or no offset with respect to a vertical longitudinal plane.

The first, second and third wing mounts 54, 56, 58 are configured to form a set of statically determinate connections between the wing structure 46 and the primary structure 50.

The various embodiments involve very few components needing to be assembled, thereby making it possible to reduce the on-board mass, to simplify fitting and obtain rapid assembly.

In one configuration, for better security, each lug or plate 54.1, 56.1, 58.1 comprises two walls pressed one against the other. To complement this, each clevis 54.2, 56.2, 58.2 comprises two mutually parallel flanges each comprising two walls pressed one against the other.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:

at least one wing, at least one propulsion unit, and at least one engine mounting system connecting the at least one propulsion unit and the at least one wing, the at least one wing having a wing structure, the at least one engine mounting system comprising a primary structure, engine mounts connecting the primary structure and the at least one propulsion unit, and at least first, second and third wing mounts connecting the primary structure and the wing structure, the primary structure having a median longitudinal plane and extending from a front toward a rear in a longitudinal direction, wherein the first and second wing mounts are offset height-wise with respect to one another, the third wing mount being offset in the longitudinal direction toward the rear with respect to the first and second wing mounts, wherein the first, second, and third wing mounts each have a connection comprising at least one axis of pivoting, or a swivel point, or both positioned in the median longitudinal plane or in a vertical longitudinal plane that is closely spaced from the median longitudinal plane, wherein the first wing mount comprises a first axis of pivoting parallel to a vertical direction, and wherein the second wing mount comprises a second axis of pivoting aligned with the first axis of pivoting.

2. The aircraft as claimed in claim 1, wherein the first, second, and third wing mounts are configured to form a set of statically determinate connections between the wing structure and the primary structure.

3. The aircraft as claimed in claim 1, wherein the wing structure comprises a front spar and a second spar offset in the longitudinal direction toward the rear with respect to the front spar, and wherein the first and second wing mounts are connected to the front spar, the third wing mount being connected to the second spar.

4. The aircraft as claimed in claim 1, wherein the third wing mount comprises a third axis of pivoting parallel to the longitudinal direction and contained in the median longitudinal plane.

5. The aircraft as claimed in claim 1, wherein each of the first, second and third wing mounts comprises a lug or a plate secured to one of the wing structure and the primary structure, a clevis secured to the other of the wing structure and the primary structure, and a cylindrical pin secured to the lug or the plate and to the clevis and embodying the first, second or third axis of pivoting.

6. The aircraft as claimed in claim 5, wherein each lug or plate comprises two walls pressed one against the other.

7. The aircraft as claimed in claim 5, wherein each clevis comprises two parallel flanges each comprising two walls pressed one against the other.

8. An aircraft comprising:

at least one wing, at least one propulsion unit, and at least one engine mounting system connecting the at least one propulsion unit and the at least one wing, the at least one wing having a wing structure, the at least one engine mounting system comprising a primary structure, engine mounts connecting the primary structure and the at least one propulsion unit, and least first, second and third wing mounts connecting the primary structure and the wing structure, the primary structure having a median longitudinal plane and extending from a front toward a rear in a longitudinal direction, wherein the first and second wing mounts are offset height-wise with respect to one another, the third wing mount being offset in the longitudinal direction toward the rear with respect to the first and second wing mounts, wherein the first, second, and third wing mounts each have a connection comprising at least one axis of pivoting or a swivel point or both positioned in the median longitudinal plane or in a vertical longitudinal plane that is closely spaced from the median longitudinal plane, wherein the first wing mount comprises a first axis of pivoting parallel to a vertical direction, wherein the second wing mount comprises a second axis of pivoting parallel to the longitudinal direction, wherein each of the first, second, and third wing mounts comprises a lug or a plate secured to one of the wing structure and the primary structure, a clevis secured to the other of the wing structure and the primary structure, and a cylindrical pin secured to the lug or the plate and to the clevis and embodying the first, second or third axis of pivoting.

9. The aircraft as claimed in claim 8, wherein the first, second and third wing mounts are configured to form a set of statically determinate connections between the wing structure and the primary structure.

10. The aircraft as claimed in claim 8, wherein the wing structure comprises a front spar and a second spar offset in the longitudinal direction toward the rear with respect to the front spar, and wherein the first and second wing mounts are connected to the front spar, the third wing mount being connected to the second spar.

11. The aircraft as claimed in claim 8, wherein the third wing mount comprises a third axis of pivoting parallel to the longitudinal direction and contained in the median longitudinal plane.

12. The aircraft as claimed in claim 8, wherein each lug or plate comprises two walls pressed one against the other.

13. The aircraft as claimed in claim 8, wherein each clevis comprises two parallel flanges each comprising two walls pressed one against the other.

14. An aircraft comprising:

at least one wing, at least one propulsion unit, and at least one engine mounting system connecting the at least one propulsion unit and the at least one wing, the at least one wing having a wing structure, the at least one engine mounting system comprising a primary structure, engine mounts connecting the primary structure and the at least one propulsion unit, and at least first, second and third wing mounts connecting the primary structure and the wing structure, the primary structure having a median longitudinal plane and extending from a front toward a rear in a longitudinal direction, wherein the first and second wing mounts are offset height-wise with respect to one another, the third wing mount being offset in the longitudinal direction toward the rear with respect to the first and second wing mounts, wherein the first, second and third wing mounts each have a connection comprising at least one axis of pivoting or a swivel point or both positioned in the median longitudinal plane or in a vertical longitudinal plane that is closely spaced from the median longitudinal plane, wherein the first wing mount comprises at least one axis of pivoting parallel to the vertical direction, wherein the second wing mount comprises a ball joint connection, wherein the first wing mount comprises a lug secured to one of the wing structure and the primary structure, a clevis secured to the other of the wing structure and the primary structure, and a cylindrical pin secured to the lug and to the clevis and embodying an axis of pivoting parallel to the vertical direction, the lug comprising an oblong hole to house the cylindrical pin, its long dimension being oriented in the longitudinal direction so as to allow the lug to move in the longitudinal direction with respect to the clevis.

15. The aircraft as claimed in claim 14, wherein the first, second and third wing mounts are configured to form a set of statically determinate connections between the wing structure and the primary structure.

16. The aircraft as claimed in claim 14, wherein the wing structure comprises a front spar and a second spar offset in the longitudinal direction toward the rear with respect to the front spar, and wherein the first and second wing mounts are connected to the front spar, the third wing mount being connected to the second spar.

17. The aircraft as claimed in claim 14, wherein the third wing mount comprises a third axis of pivoting parallel to the longitudinal direction and contained in the median longitudinal plane.

18. The aircraft as claimed in claim 14, wherein the second wing mount comprises a lug secured to one of the wing structure and the primary structure, a clevis secured to the other of the wing structure and the primary structure, and a cylindrical pin secured to the lug and to the clevis and embodying the second axis of pivoting, the ball joint connection being interposed between the lug and the cylindrical pin.

19. The aircraft as claimed in claim 14, wherein each lug or plate comprises two walls pressed one against the other.

20. The aircraft as claimed in claim 14, wherein each clevis comprises two parallel flanges each comprising two walls pressed one against the other.

* * * * *